United States Patent [19]

Fish et al.

[11] Patent Number: 4,592,453

[45] Date of Patent: Jun. 3, 1986

[54] LOCK ACTUATOR ASSEMBLY

[75] Inventors: Aaron M. Fish, Hampstead; Jean-Paul Dausseing, Laval; Leon Mayzels, Montreal, all of Canada

[73] Assignee: Ilco Unican Inc., Montreal, Canada

[21] Appl. No.: 593,833

[22] Filed: Mar. 27, 1984

[51] Int. Cl.⁴ .............................................. F16D 43/26

[52] U.S. Cl. .................................. 192/0.02 R; 70/269; 192/0.07

[58] Field of Search .............. 192/0.02 R, 0.07, 0.075, 192/93, 101, 150; 70/268, 269, 271

[56] References Cited

U.S. PATENT DOCUMENTS

| | | | |
|---|---|---|---|
| 2,318,908 | 5/1943 | Welch | 70/268 X |
| 2,936,052 | 5/1960 | Snarr | 192/0.02 R |
| 3,861,507 | 1/1975 | Bloom | 192/0.002 R X |
| 3,982,129 | 11/1976 | Brandenstein | 192/0.02 R X |
| 4,196,347 | 4/1980 | Hadley | 70/271 X |
| 4,478,320 | 10/1984 | Baba | 192/150 X |

FOREIGN PATENT DOCUMENTS

| | | | |
|---|---|---|---|
| 967614 | 5/1975 | Canada | 70/269 |
| 1553485 | 3/1970 | Fed. Rep. of Germany | 70/269 |
| 2942852 | 5/1981 | Fed. Rep. of Germany | 70/268 |

*Primary Examiner*—William F. Pate, III
*Assistant Examiner*—Dwight G. Diehl
*Attorney, Agent, or Firm*—Fleit, Jacobson, Cohn & Price

[57] ABSTRACT

An actuator assembly having a clutch mechanism with an input disc and an output disc. Mechanisms are provided for rotating the input disc and preventing rotation of the output disc with the input disc when the assembly is in a rest condition, and for effecting a rotation transmitting connection between the input disc and the output disc when the assembly is in an actuated condition. A mechanism is also provided for automatically returning the assembly from the actuated condition to the rest condition: (1) if the first input disc is rotated within a given time delay, upon the rotation; or (2) if the first disc is not rotated within the given time delay, upon the expiration of the time delay. Thus, the second output disc can be rotated only once within the time delay, and the second disc is not rotatable at all if the first disc is not rotated within the time delay.

12 Claims, 9 Drawing Figures

LOCK ACTUATOR ASSEMBLY

BACKGROUND OF INVENTION (a) Field of the Invention

The invention relates to an actuator assembly which includes a clutch mechanism having an input disc and an output disc. More specifically, the invention relates to such an assembly wherein the output disc can only be rotated once, when the assembly is actuated, within a given time delay, and wherein the second disc is not rotatable if the first disc is not rotated within the time delay.

(b) Description of Prior Art

Known in the art are various actuator assemblies for door locking mechanisms. Most of these actuator assemblies will remain open until such time as the door is opened once they have been actuated. Thus, if the assembly is actuated and the person actuating the assembly decides to leave and not open the door, the door is left open for possible unauthorized entry.

In addition, in a large number of actuator assemblies, once the assembly is actuated, the door remains open until a positive action is taken by a person to lock the door.

Further, actuator assemblies known in the art are subject to break-ins by mechanical picks or the like.

SUMMARY OF INVENTION

It is therefore an object of the invention to provide an actuator assembly which overcomes all of the above disadvantages.

In accordance with the invention, there is provided an actuator assembly having a clutch mechanism with an input disc and an output disc. Means are provided for rotating the input disc. Means are provided for preventing rotation of the output disc with the input disc when the assembly is in a rest condition, and for effecting a rotation transmitting connection between the input disc and the output disc when the assembly is in an actuated condition. Means are also provided for automatically returning the assembly from the actuated condition to the rest condition: (1) if the first input disc is rotated within a given time delay, upon the rotation; or, (2) if the first disc is not rotated within the given time delay, upon the expiration of the time delay. Thus, the second output disc can be rotated only once within the time delay, and the second disc is not rotatable at all if the first disc is not rotated within the time delay.

BRIEF DESCRIPTION OF DRAWINGS

The invention will be better understood by an examination of the following description together with the accompanying drawings in which.

DESCRIPTION OF PREFERRED EMBODIMENTS

Figure 1:
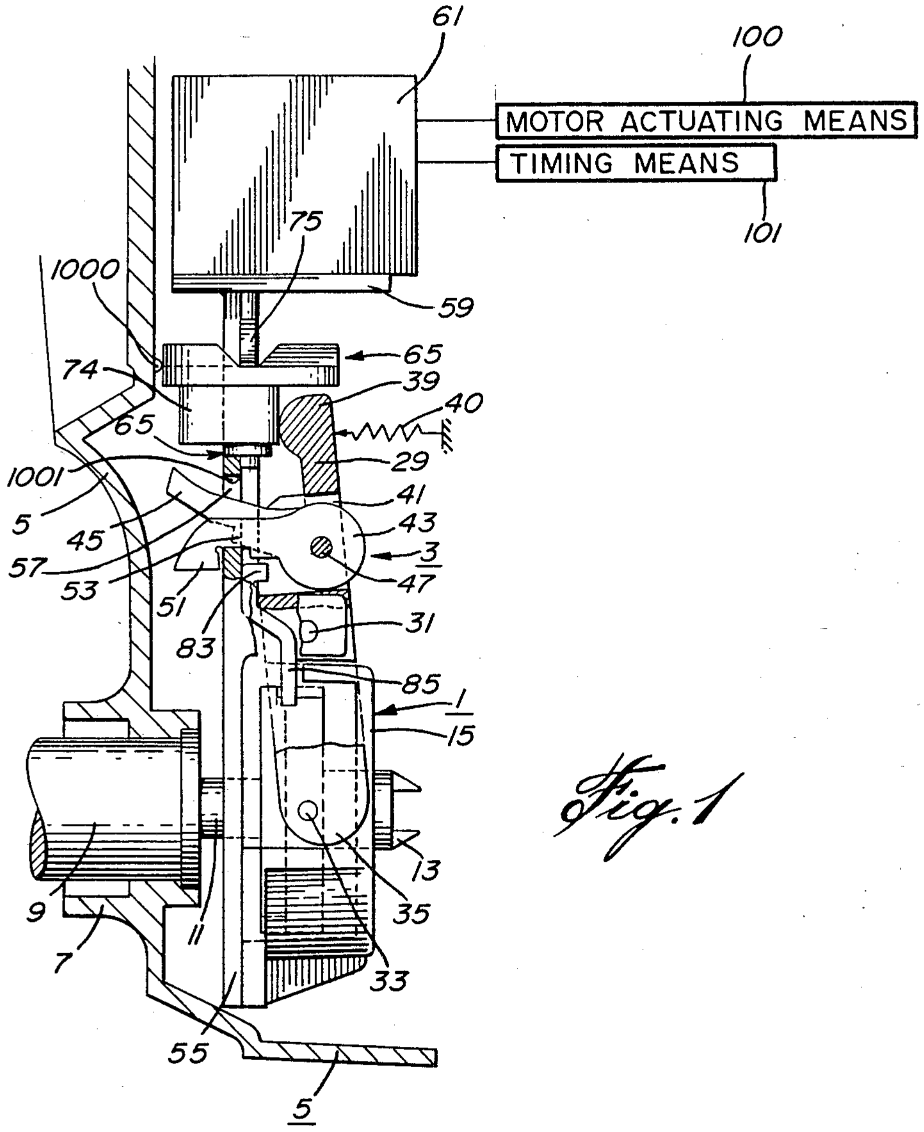
FIG. 1 is a side view of an actuator assembly, in accordance with the invention, shown in its rest condition, portions thereof being shown in section.

Referring now to the drawings, the actuator includes a clutch mechanism, illustrated generally at 1, and means for effecting a rotation transmitting connection of the clutch mechanism illustrated generally at 3. The actuator is housed in a casing 5 having an opening 7 therethrough at the front of the actuator. A knob sleeve 9, which is spring loaded, by means not shown, to return to its initial position extends through the opening and is in rotation transmitting communication with a connecting member 11 at the input of the clutch.

A shaft receiving member 13 is disposed at the output side of the clutch. The clutch is housed in a clutch housing 15.

Figure 4:
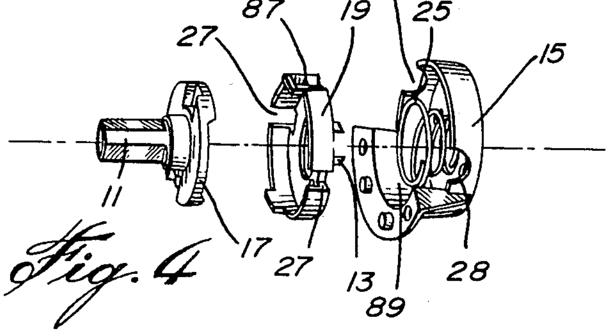
FIG. 4 is an exploded perspective view of the clutch mechanism.

Referring to FIG. 4, the clutch member includes an input disc 17, which is connected to the input connecting member 11, for rotation therewith, and an output disc 19, which is connected to the shaft receiving member 13 for rotation therewith. The connecting member 11 is connected to knob sleeve 9 for rotation therewith so that input disc 17 rotates with the rotation of knob sleeve 9.

Figure 5:
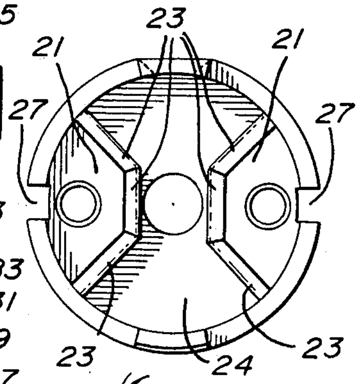
FIG. 5 illustrates the facing surfaces of the input and output discs of the clutch mechanism.

As the facing surfaces of both input and output discs are identical, only the facing surface of the output disc is shown in FIG. 5 to illustrate the facing surfaces of both input and output discs.

The facing surfaces of both the input and output discs includes diametrically opposed abutments 21 having bevelled surfaces 23 at their terminating edges. The abutments are disposed on a lower surface 24 and are preferably formed integrally with the lower surface.

Returning to FIG. 4, disposed in the clutch cover is a spring means 25 which urges the output disc against the input disc. Closing slot means comprising, for example, slots 27 are disposed on diametrically opposed peripheral surfaces of the output disc 19, and the closing slots are in alignment with openings 28 of the cover 15. The openings 28 overlie the slots 27.

The clutch mechanism operates in a manner well known in the art, namely, with the spring 25 urging the output disc against the input disc, and with the abutments of the input disc being arranged to be located on the lower surfaces of the output disc, and vice-versa, when the input disc is rotated, the output disc will also rotate. However, if the output disc is held against rotation, for example, by applying fixed means in the closing slots 27 thereof, rotation of the output disc will not be possible even when the input disc is rotated. Instead, the bevelled surfaces of the input disc will cam with the bevelled surfaces of the output disc to push the output disc rearwardly against the force of the spring 25. Thus, the rotation of the input disc will still be possible, however, the rotation of the input disc will, in this condition, not be transmitted to the output disc.

Figure 2:
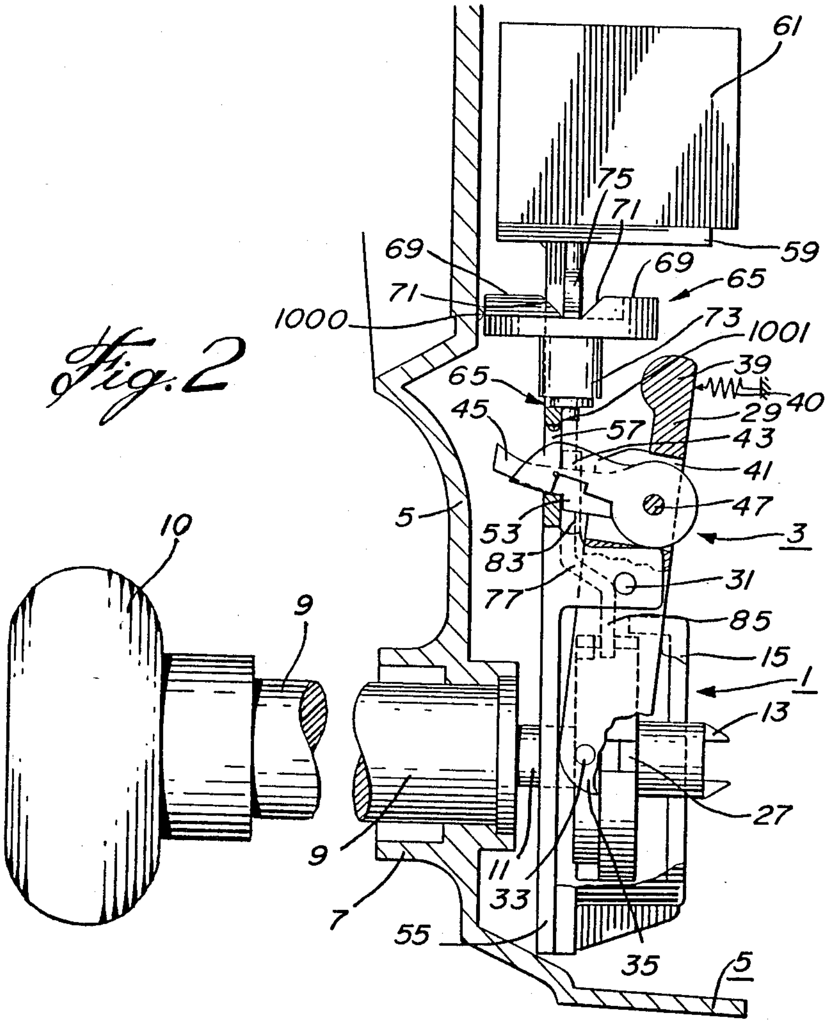
FIG. 2 is a view similar to FIG. 1 with the actuator assembly in its actuated condition.
Figure 3:
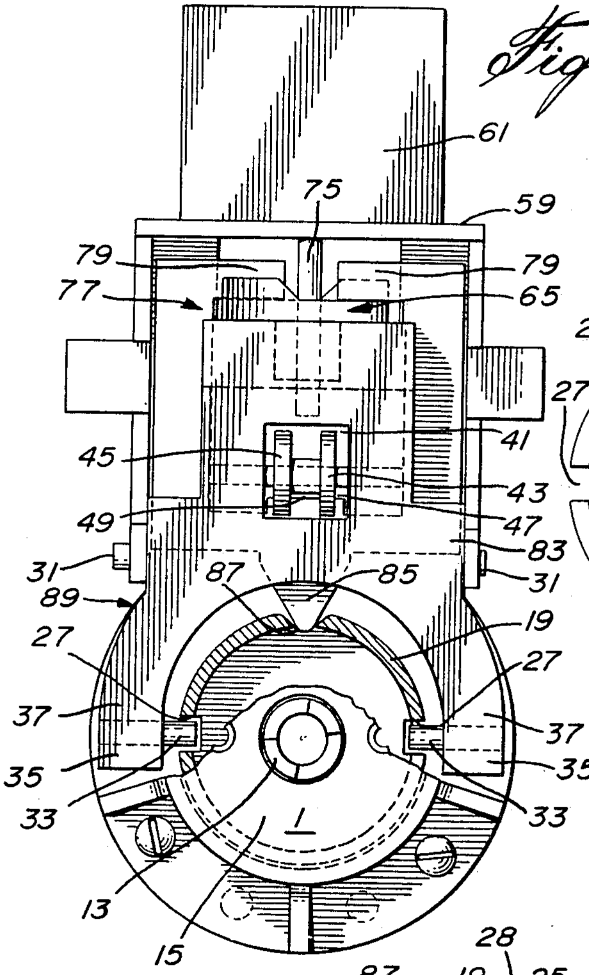
FIG. 3 is a rear view of the embodiment of FIG. 1, partially in section.

Returning now to FIGS. 1, 2 and 3, the means 3 for effecting a rotation transmitting connection of the clutch comprises a pivoting fork 29. The pivoting fork is mounted for pivoting about a fixed pivot point 31 and includes locking pins 33 at the lower edges 35 thereof. The lower end of the pivoting fork comprises leg means, comprising, for example, legs 37 which straddle the clutch mechanism 1 as best seen in FIG. 3. As can also be seen in FIG. 3, in one position of the pivoting fork, the locking pins 33 are located in the closing slots 27 to hold the output disc against rotation.

The top end of the pivoting fork comprises an abutment end 39 to be discussed below. Spring means, illustrated diagramatically at 40 in FIGS. 1 and 2 urge the fork means into its rest condition as shown in FIG. 1.

Extending from opening 41 in fork 29 are a locking lever 43 and a fork holding lever 45. The levers 43 and 45 are mounted for pivotal motion on shaft 47 carried by the fork 29. Although the levers are biassed in a downward direction by the force of gravity alone, it is preferable to provide a spring means, illustrated diagrammatically at 49 in FIG. 3, to provide a positive bias of the levers in a downward direction. The front end of lever 43 includes a retaining dog 51, and a depending abutment member 53 is provided on the lower edge of lever 45.

Figure 6:
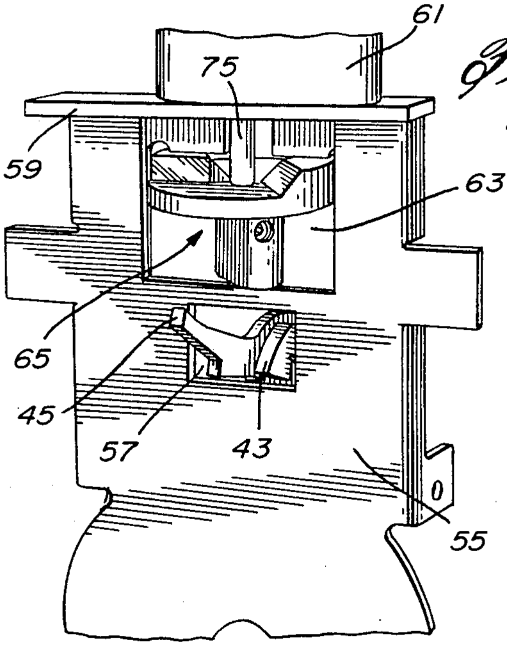
FIG. 6 is a perspective view of the mechanism as seen from the rear.

Disposed forward of the pivoting fork 29 is a mounting plate 55 fixed with respect to the casing 5. The position of the mounting plate is illustrated in FIGS. 1 and 2, and the mounting plate is per se illustrated in greater detail in FIG. 6. Turning to FIG. 6, the mounting plate includes a bottom opening 57 through which the levers 43 and 45 extend. A platform 59 is constructed at the top of the mounting plate and supports a rotating mechanism, such as a motor, 61.

The mounting plate also includes a top opening 63 in which is mounted a dual function cam member 65.

Figure 7:
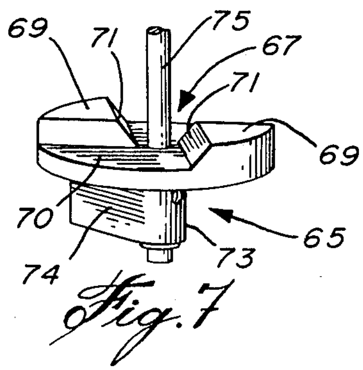
FIG. 7 is a perspective view of the dual function cam member per se.

The dual function cam member is illustrated in greater detail in FIG. 7 and it includes a top surface 67 having abutments 69 mounted on rest surface 70. Preferably, the abutments are formed integrally with the rest surface.

The edges of the abutments are terminated by bevelled surfaces 71 at the attack end thereof.

Depending from the bottom surface of the dual function cam member is an eccentric cam 73 having a radially extending arm 74. Extending from the top surface is a motor connecting shaft 75.

Figure 8:
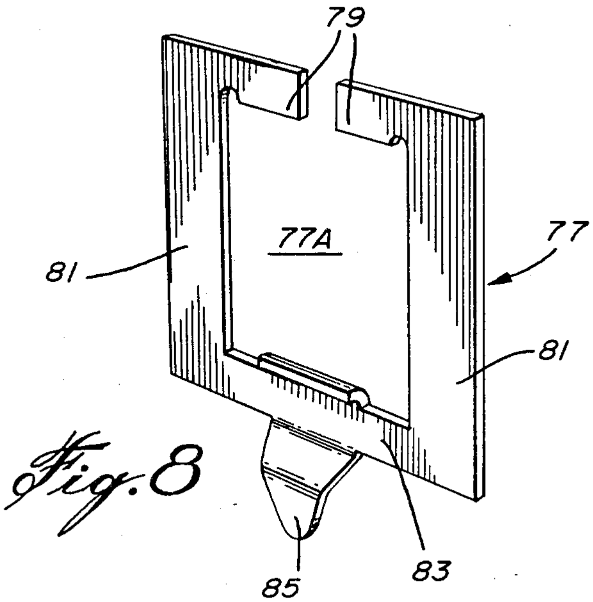
FIG. 8 is a perspective view of the slider member per se.

Referring to FIG. 3, disposed in front of the pivoting fork and behind the support plate is a vertically movable slider member 77. The slider member, which is illustrated in more detail in FIG. 8, includes arms 79 which, as can be seen in FIGS. 1, 2 and 3, are disposed horizontally over the dual function cam member. The arms 79 are connected, by vertically connecting members 81, to a transverse bottom strip 83 to define opening 77A. Extending downwardly from the bottom strip is a slider nose 85. As seen in FIG. 3, the nose 85 extends into an indent 87 in the output disc 19.

The slider nose 85 can extend into the indent 87 because the housing 15 does not cover the top part of the output disc 19. The bottom part of the output disc is covered by the rear bottom extension 89 of the housing 15, however, as seen in FIG. 4, the top of the output disc 19 remains uncovered.

As seen in FIG. 3, the top surface of the bottom strip 83 underlies the bottom surface of the opening 57 in the supporting plate so that, when the slider member moves upwardly, it will contact the levers 43 and 45 and force them in an upward direction against the action of spring 49.

In operation, the actuator assembly works as follows:

In the rest condition, as illustrated in FIG. 1, the retaining dog 51 on lever 43 overlies the front surface of the bottom edge of opening 57 to thereby restrain pivoting motion of the pivoting fork 29. In addition, the arms 79 of the slider member 77 rest on the rest surface 70 of the dual function cam member. Thus, as seen in FIG. 1, the bottom strip 83 of the slider member does not make contact with the levers 43 and 45.

The lever 45 is maintained in an upward position by contact of the depending member 53 on the bottom edge of the opening 57.

In the rest position, as seen in FIG. 1, the arm 74 of the eccentric cam 73 faces away from the abutment end 39 of the pivoting fork 29, and the latter bears against the concentric surface of cam 73.

In the rest condition, locking pins 33 are disposed in the closing slots 27 of the output disc of the clutch mechanism, as seen in FIG. 3, so that rotation of the input disc, which is transmitted thereto by rotation of the knob sleeve 9, will not be transmitted to the output disc 19.

When the actuator is in the rest position illustrated in FIG. 1, the slider arms, resting as they do on the surface 70, place the slider member 77 in its downward position. In this position, the nose 85 of the slider member extends into the indent 87 of the output disc 19. However, as the slider member is free-moving, this does not prevent the rotating motion of the output disc. Instead, as above-mentioned, it is the disposition of the locking pins 33 in the closing slots 27 of the output disc which prevents rotation of the output disc.

When the motor 61 is actuated, it will cause the shaft 75 to rotate the dual function cam member 65. Accordingly, the bevelled surfaces 71 of the cam member will engage the arms 79 of the slider member to raise the slider member. This will bring the bottom strip 83 of the slider member in contact with lever 43 raising this lever so that the retaining dog 51 of the lever is raised above the bottom surface of the opening 57 thus freeing the pivoting fork 29.

At the same time, the arm 74 of the eccentric cam 73 will contact abutment end 39 of the pivoting fork and will force the abutment end to move rearwardly. When the abutment end of the pivoting fork moves rearwardly, because of the pivoting motion, the bottom end of the pivoting fork will move forwardly to a position as shown in FIG. 2. As can be seen in FIG. 2, with the pivoting fork pivoted out of its rest condition into the actuated condition, the locking pins 33 are moved out of the closing slots 27 so that the output disc 19 is no longer restrained. Accordingly, rotation motion of the input disc will now be transmitted to the output disc thereby effecting a rotation transmitting connection of the clutch mechanism.

As seen in FIG. 2, when the actuator is in its actuated condition, the front edge of the depending member 53 on lever 45 engages with the inner surface adjacent the bottom edge of the opening 57 in the mounting plate 55 to thereby prevent the pivoting fork 29 from returning to its rest condition by action of the spring 40. It is also noted that the dual function cam member is rotated through a large enough angle so that, in the actuating condition, the slider member 77 once again moves downwardly, and the nose 85 of the slider member is once again disposed in the indent 87 of the output disc. However, as above-mentioned, as the slider member is free-moving, this will not restrain the rotary motion of the output disc. In addition, arm 74 will face away from abutment 39 so that arm 74 will not prevent forward movement of fork 29.

The motor is actuated by means, shown diagrammatically at 100 in FIGS. 1 and 2, which is connected to the motor by means well known in the art but now shown in the drawings. The means 100 can comprise a keyed mechanism or an electronic or mechanical numerical combination means or other means well known in the art, and the actuating means will, as well known in the art, provide power to the motor when appropriate action is taken.

The actuating assembly will remain in its actuated condition until such time as the slider member is once again lifted upwardly. This can be accomplished in one of two ways.

1. By rotating the knob sleeve to thereby rotate, through the agency of the connecting member 11, the input disc 17 of the clutch mechanism. When the input disc is rotated, the output disc will also be rotated to thereby force the nose 85 of the slider member out of the indent 87 and to lift it onto the outer peripheral surface of the output disc. This lifting action of the nose of the slider member will, of course, move the slider member itself upwardly so that the bottom strip 83 of the slider member will lift the fork holding lever 45 by making contact with the bottom edge of its depending abutment member 53. Accordingly, with lever 45 raised so that the depending abutment member 53 is above the top edge of the opening 57, pivoting fork 29 will be free to return to its rest position, and will return there because of the action of the spring means 40.

When the spring loaded knob sleeve 9 is released, it returns to its initial position so that the input disc will return to its initial position and the output disc will also return to its initial position, so that the nose 85 of the sliding member will once again fall into the indent 87 of the output disc. Accordingly, the arms 79 will once again rest on the surface 70 of the dual function cam member, and the sliding member will be in its lower position. Thus, the entire actuating assembly will have returned to its rest condition as illustrated in FIG. 1. During this procedure, the motor 61 is not actuated so that dual function cam 65 does not rotate.

2. Alternatively, and in accordance with the invention, the slider member can be lifted through the agency of a timing means illustrated diagrammatically at 101 in FIGS. 1 and 2. The timing means will, after a predetermined delay, and in the face of non-rotation of the knob sleeve 9, once again actuate the motor 61 to rotate it through a further predetermined angle, i.e., a minimum of 90° and a maximum of 180°. Once again, the slider member will be raised when the arms 79 slide up the bevelled surfaces 71 of the dual function cam member and then ride along the top of the abutment 69. This raising of the sliding member will have the same effect as the raising of the sliding member due to the action of the nose 85 being forced out of the indent 87, so that the timing means will also force the actuator assembly back to its rest condition.

In the absence of a timing mechanism as above-described, if someone should actuate the motor 61, for example, by using a proper key or a correct combination or the like, and then neglect to rotate the knob sleeve, the actuator assembly would remain in its actuated condition indefinitely possibly permitting unauthorized entry at a later time. Thus, providing the timing means provides an extra safety feature in accordance with the invention.

The knob sleeve is connected to, for example, a door knob 10 (see FIG. 2) or the like for rotation, and the shaft receiving member is connected to the shaft of, for example, a latch mechanism or the like to retract the latch as well known in the art. With the inventive actuator assembly, it can be seen that the lock is automatically self-closing either after a single opening or after a predetermined time delay. Accordingly, it is especially advantageous in preventing unauthorized entry. In addition, as the actuation is initiated by an electrical signal, the initiation means can comprise a combination mechanism with changeable combinations.

Further, the provision of the lever 43 to restrain the fork 29 from pivoting motion when the assembly is in its rest condition provides an added measure of security in accordance with the invention. Although spring means 40 will urge fork 29 into its rest position to thereby maintain the pins 33 in slots 27, vibrations or jarring forces applied to the mechanisms could overcome the force of the spring to permit the pins to slide out of the slots. The action of lever 43, when it is in its rest condition, prevents this.

Although in the illustrated embodiment, pins 33 extend from legs 37 into slots 27 on output disc 19, it will be apparent that the pin and slot arrangement could be reversed, i.e, the pins could be on the output disc 19 and the slots on the legs 37. Or other means could be used to prohibit the rotation of the output disc when the assembly is in the rest condition. In addition, it is not necessary that there be two legs 37 as a single leg is sufficient.

Considering the timing means, as such timing means will readily be constructed from available components by one skilled in the art, it is more instructive to discuss a flow chart illustrating the logic of such a timing means rather than describing a particular circuit. For this purpose, attention is directed to FIG. 9.

The first step is to determine when the actuator assembly is in its actuated condition. For this purpose, a sensor, for example, a microswitch, illustrated schematically at 1000 in FIGS. 1 and 2, and mounted on the casing 55 adjacent the dual function cam assembly 65 could be employed. For example, in the case of a microswitch, the outer peripheral surface of the cam member 65 could press against the microswitch to keep it depressed at all times. A notch would be placed on the outer peripheral surface at such a position that the motor should be stopped when the notch is sensed by the microswitch. When the notch is so sensed, a signal is generated which tells the control circuitry that the assembly is now in its actuated condition. This signal is the control signal for stopping the motor. In this regard, when the assembly is actuated, the dual function cam assembly must be rotated through a large enough angle to raise the sliding member so that it lifts the levers 43 and 45 permitting the pivoting fork 29 to move rearwardly. It must also move through a large enough angle so that the arm 74 will push against the abutment member 39 to force fork 29 rearwardly while levers 43 and 45 are lifted. Finally, it must move through a large enough angle so that the arm 74 will move into a position such that it will not prevent fork 29 from returning to its forward position, i.e., the arm 74 must not be pointing towards the abutment end 39. Thus, in FIG. 2 it is illustrated as being rotated 90° from the position that it would be in if it were pointing to the abutment end 39.

When the motor stops, the security timing period is initiated.

Figure 9:
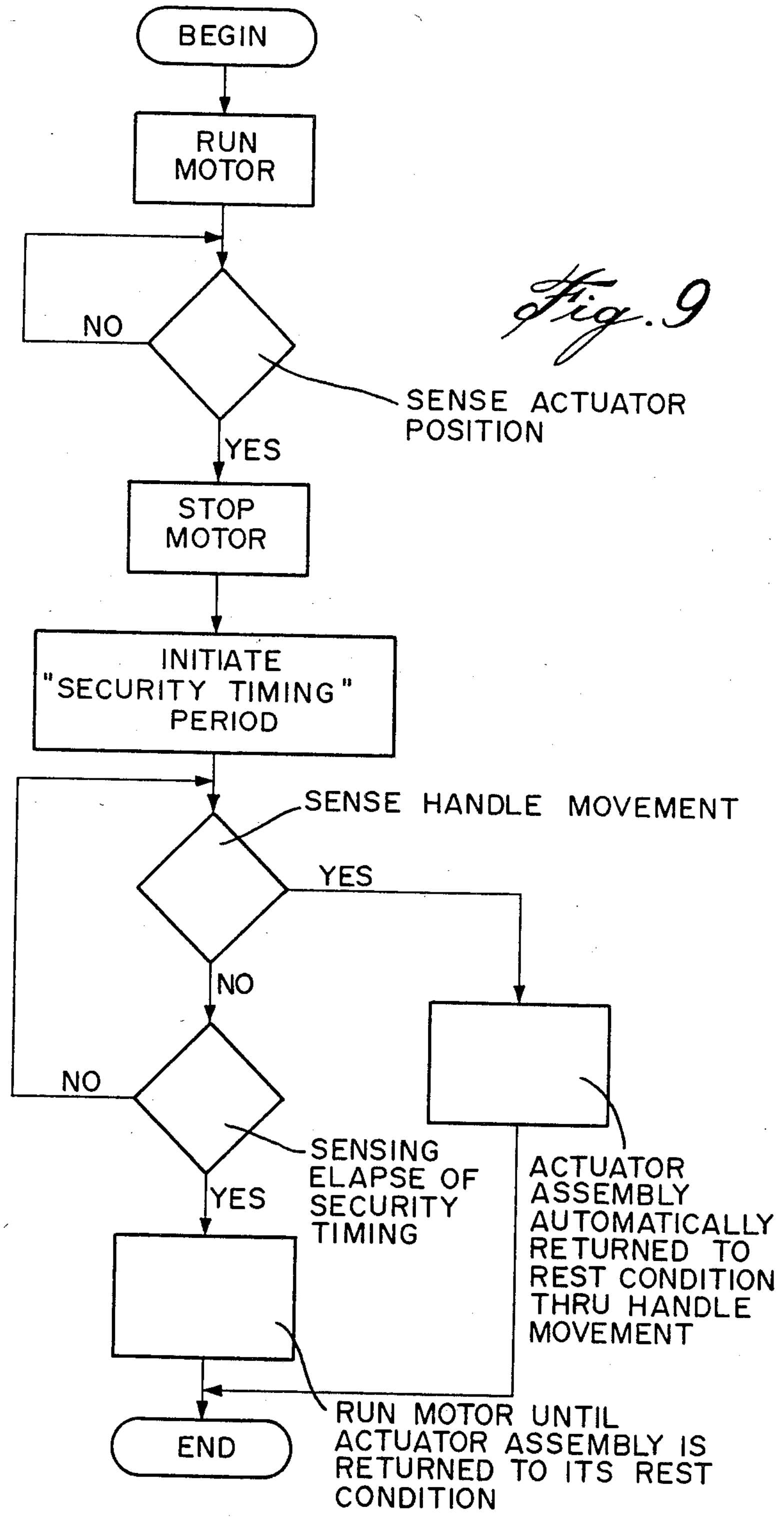
FIG. 9 is a flow chart illustrating the logic for the timing means.

This action is represented in the topmost decision block of FIG. 9.

With the assembly in its actuated condition, it now remains to determine whether:

1. The handle is turned; or

2. The security timing period has elapsed.

In order to determine the former, a sensor, such as a second microswitch illustrated schematically at 1001 in FIGS. 1 and 2, and which could be located on the inner top surface of the opening 57 of the mounting plate 55, would be placed in such a position so that, when the levers are lifted, one of the levers will depress the microswitch 1001. The sensing of the pressing of this microswitch will bypass the security timing action as seen in FIG. 9.

If the security timing period elapses before the handle is moved, then a signal will be sent to turn the motor on to return the actuator assembly to its rest condition. At this time, dual function cam member 65 must be rotated through an angle of between 90° and 180°, i.e., an angle large enough to ensure that the slider member 77 is lifted to lift the levers 43 and 45, and to ensure that, when the motor stops, that the arm 79 of the sliding member 77 rest on the surface 70 of cam 65. The amount of time that the motor should run after the lapsing of the security timing period can be determined either by sensing the rotation of the dual function cam member 65 (for example, with a microswitch as previously), or it can be set to run for a given period of time. In the latter case, allowances would have to be made for the deterioration of the battery driving the motor as the motor will rotate at a greater speed when the battery is at its peak, than after the battery has deteriorated. Accordingly, the timing period for the motor in this case should be set to ensure that it does not run too far on a fully charged battery, and that it does run far enough after the battery has deteriorated.

The arm 74 will not point in the same direction when the assembly arrives in its unactuated condition after returning of the handle as it will when the assembly arrives in its unactuated condition after an elapsing of the security timing. It is for this reason that a position sensor must be used to determine when the assembly has arrived in its actuated condition.

Although the description above refers to microswitches 1000 and 1001, it is obvious that other position sensors could be used. For example, light sensors could sense either a lighter or darker spot as appropriate.

Although a single embodiment has been described, this was for the purpose of illustrating, but not limiting, the invention. Various modifications which will come readily to the mind of one skilled in the art are within the scope of the invention as defined in the appended claims.

We claim:

1. An actuator assembly comprising:

a clutch mechanism having an input disc and an output disc;

means for rotating said input disc;

means for preventing rotation of said output disc with said input disc when said assembly is in a rest condition, and for effecting a rotation transmitting connection between said input disc and said output disc when said assembly is in an actuated condition;

means for automatically returning said assembly from said actuated condition to said rest condition: (1) if said input disc is rotated within a given time delay, upon said rotation; or, (2) if said input disc is not rotated within said given time delay, upon the expiration of said time delay;

whereby, said output disc can be rotated only once within said time delay, and whereby said output disc is not rotatable if said input disc is not rotated within said time delay.

2. An assembly as defined in claim 1 wherein said means for preventing rotation of said output disc with said input disc comprises a pivoting fork, said pivoting fork being pivotable from a first condition, when said assembly is in its rest condition, to a second condition, when said assembly is in its actuated condition, and vice-versa, said pivoting fork having leg means straddling said clutch mechanism;

said leg means including restraining means for restraining motion of said output disc when said assembly is in said rest condition.

3. An assembly as defined in claim 2 wherein said output disc has closing slot means on the peripheral surface thereof;

and wherein said restraining means comprises locking pin means on said leg means;

said locking pin means being disposed in said closing slot means when said fork is in said first condition whereby to restrain rotation of said output disc; and said locking pin means being movable out of said closing slot means by the pivoting action of said pivoting fork when said fork is moved to said second condition, whereby motion of said output disc is no longer retrained and rotation transmission of said input disc to said output disc is possible.

4. An assembly as defined in claim 3 and further including a mounting plate substantially parallel to said pivoting fork when said pivoting fork is in said first condition;

an opening in said pivoting fork above the pivoting point thereof for pivotally mounting a first lever and a second lever;

a lever receiving opening in said mounting plate, said levers being adapted to extend through said lever receiving opening;

said first lever being adapted to maintain said fork in its first condition; and said second lever being adapted to maintain said fork in its second condition.

5. An assembly as defined in claim 4 wherein said first lever has a retaining dog at the front end thereof which overlaps the bottom edge of the opening of the mounting plate at the surface of the mounting plate remote from said fork to thereby prevent backward pivoting of said pivoting fork and thereby maintain said pivoting fork in said first condition; and said second lever having a depending abutment member close to the pivoting end thereof which depending abutment member falls behind the surface of the back plate adjacent to said pivoting fork at the bottom edge of the opening of the mounting back plate to thereby prevent forward pivoting of said fork and thereby maintain said fork in its second condition.

6. An assembly as defined in claim 5 and further including a sliding member movably mounted between said mounting plate and said fork;

said sliding member being normally disposed in a downward position;

means for moving said sliding member upwardly to an upward position;

said sliding member having a bottom strip disposed below said mounting plate opening when said sliding member is in its downward position;

said bottom strip contacting the bottom edges of said levers and forcing them upwardly when the sliding member is moved upwardly;

whereby, when the sliding member is in its upward position, the bottom edges of said depending abutment member and said retaining dog are above the bottom edge of said opening in said mounting plate, so that said pivoting fork is free to pivot.

7. An assembly as defined in claim 6 and further including a dual function cam member, including;

first means for moving said sliding member upwardly; and second means for forcing the top end of the pivoting fork backwardly to thereby cause said pivoting fork to pivot backwardly, away from the mounting plate.

8. An assembly as defined in claim 7 wherein said cam member has a circular top surface;

and wherein said sliding member has cross arms at the top end thereof extending across the top surface of the cam member;

(A) said first means comprising, on said top surface, (1) a lower surface (2) abutments above the lower surface defining a higher surface, said abutments being terminated in bevelled surfaces at the attack end thereof, whereby, said arms normally rest on said lower surface, and whereby, when said cam member is rotated, said arms slide along said bevelled surfaces onto said abutments to thereby move said sliding member from said downward position to said upward position;

(B) said second means comprising a cam member extending downwardly from said top surface and having an arm for contacting the top end of the pivoting fork, when said cam member is rotated, and forcing the top end of the pivoting fork backwards to thereby cause said pivoting fork to pivot backwards.

9. An assembly as defined in claim 8 and further including motor means, mounted above said dual function cam means, for rotating said cam means;

said motor means being actuatable by a keyed mechanism or a numerical combination means;

said motor being further actuatable by a timing mechanism actuated by said keyed mechanism or numerical combination means.

10. An assembly as defined in claim 9 and including an indent in the top peripheral surface of said output disc;

a nose extending downwardly from the bottom edge of said sliding member being disposed in said indent when said sliding member is in its downward position;

said nose being forced out of said indent and upwardly when said output disc is rotated;

whereby to move said sliding member upwardly to its upward position.

11. An assembly as defined in claim 10 wherein said means for rotating said input disc comprises a door knob.

12. An assembly as defined in claim 11 wherein said means for automatically returning comprises:

means for sensing when said assembly is in its actuated condition;

means for turning off said motor means when said above condition is sensed;

means for sensing when said handle means is turned after the above condition has been sensed whereby said assembly is returned to its rest condition;

means for sensing the elapse of said time delay after the first condition has been sensed, whereupon said motor is turned on to return the assembly to its rest condition.

* * * * *